United States Patent [19]

Fujitani et al.

[11] 4,299,734

[45] Nov. 10, 1981

[54] CATALYST FOR PURIFYING EXHAUST GASES AND METHOD FOR PRODUCING SAME

[75] Inventors: Yoshiyasu Fujitani; Hideaki Muraki, both of Nagoya; Shiroh Kondoh, Aichi; Makoto Tomita, Obu; Kouji Yokota; Hideo Sobukawa, both of Nagoya, all of Japan

[73] Assignee: Kabushiki Kaisha Toyota Chuo Kenkyusho, Nagoya, Japan

[21] Appl. No.: 151,601

[22] Filed: May 20, 1980

[30] Foreign Application Priority Data

May 23, 1979 [JP] Japan .................................. 54/64475

[51] Int. Cl.$^3$ ......................... B01J 21/04; B01J 23/10; B01J 23/84; B01J 23/89
[52] U.S. Cl. ............................. 252/462; 252/466 PT; 252/446 B; 252/471; 252/472; 423/213.5
[58] Field of Search ................. 252/461, 462, 466 PT, 252/466 B, 471, 472; 423/213.5

[56] References Cited

U.S. PATENT DOCUMENTS

| | | | |
|---|---|---|---|
| 3,524,721 | 8/1970 | Stephens | 252/466 J |
| 3,669,906 | 6/1972 | Koberstein et al. | 252/466 J |
| 4,171,288 | 10/1979 | Keith et al. | 252/462 |
| 4,173,549 | 11/1979 | Kent et al. | 252/471 X |
| 4,206,134 | 6/1980 | Kugler et al. | 252/462 X |

Primary Examiner—W. J. Shine
Attorney, Agent, or Firm—Oblon, Fisher, Spivak, McClelland & Maier

[57] ABSTRACT

A catalyst for reducing nitrogen oxides, carbon monoxide and hydrocarbons, the noxious components in exhaust gases from internal combustion engines, etc., comprising: a porous carrier consisting essentially of zirconia and at least one oxide selected from the group consisting of cerium oxide, manganese oxide and iron oxide; and a metal as a catalyst ingredient supported thereon selected from the group consisting of platinum, palladium and mixtures thereof.

A method for producing the aforesaid catalyst.

13 Claims, No Drawings

CATALYST FOR PURIFYING EXHAUST GASES AND METHOD FOR PRODUCING SAME

BACKGROUND OF THE INVENTION

1. Field of the Invention

This invention relates to a catalyst for purifying exhaust gases which can reduce with high efficiency nitrogen oxides, carbon monoxide and hydrocarbons, the noxious components of exhaust gases from internal combustion engines, etc., and which has high mechanical strength and durability at high temperatures.

2. Description of the Prior Art

Various catalysts have been suggested to date for reducing the noxious components of such exhaust gases as mentioned above. Catalysts containing platinum, palladium or rhodium as a catalyst ingredient supported on an alumina carrier are considered to have a relatively superior purifying activity.

However, these catalysts are still unable to meet the requirements for the purification of motor vehicle exhaust gases because they cannot reduce the aforesaid three noxious components with high efficiency, and do not have superior mechanical strength and durability at high temperatures.

A need therefor continues to exist for a catalyst for the removal of nitrogen oxides, carbon monoxide and hydrocarbons from the exhaust gases of internal combustion engines, which exhibits high efficiency for said removal and exhibits high mechanical strength and durability at high temperatures.

SUMMARY OF THE INVENTION

Accordingly, one object of the invention is to provide a catalyst for efficiently and effectively reducing nitrogen oxides, carbon monoxide and hydrocarbons which are the noxious components in exhaust gases from internal combustion engines, etc.

Another object is to provide a catalyst having an especially superior effect in the simultaneous reduction of the noxious components in gases exhausted from an internal combustion engine operated at an air-fuel ratio of from 13.5 to 15.5.

A further object of the present invention is to provide a catalyst which has high mechanical strength and durability at high temperatures.

A still further object is to provide a method for producing the aforesaid efficient and superior catalyst.

Briefly these objects and other objects of the invention as hereinafter will become more readily apparent can be attained by providing a catalyst for purifying exhaust gases, said catalyst comprising platinum (Pt), palladium (Pd) or mixtures thereof supported on a carrier, said carrier being a porous body consisting of zirconia ($ZrO_2$) and at least one oxide of cerium oxide ($CeO_2$), manganese oxide ($MnO_2$) and iron oxide, e.g., ferrous oxide, ferric oxide and mixtures thereof.

DETAILED DESCRIPTION OF THE PREFERRED EMBODIMENTS

According to this invention, a catalyst can be obtained which can reduce the aforesaid noxious components, i.e., nitrogen oxides ($NO_x$), carbon monoxide (CO) and hydrocarbons (HC), in a high efficiency. The catalyst exhibits an especially superior effect for the simultaneous reduction of the aforesaid noxious components in gases exhausted from an internal combustion engine which is operated at an air-fuel ratio (the weight ratio of air to gasoline fed into the internal combustion engine) of from 13.5 to 15.5. Since the porous carrier of the catalyst of this invention mainly consists of zirconia, the catalyst has high mechanical strength at high temperatures. Furthermore, even when it is used at high temperatures, the crystal structure does not change as in the case of general alumina carriers such as $\gamma$-alumina and $\delta$-alumina and the losses in surface area and the reduction in mechanical strength which accompany the above change are obviated. Moreover, the catalyst exhibits a good duration of catalytic activity at high temperatures. Since the carrier of the catalyst of this invention contains at least one oxide of cerium oxide, manganese oxide and iron oxide, the catalyst has a much higher purifying activity than the carrier not containing the aforesaid oxides.

The content of at least one oxide of cerium oxide, manganese oxide and iron oxide in the porous carrier is preferably from 1 g to 80 g per liter of the porous carrier. If the content is less than 1 g/l, purifying activity of the catalyst is low, and if the content is more than 80 g/l, no corresponding increase in activity can be observed.

Supporting of platinum, palladium or mixtures thereof as catalyst ingredients on the aforesaid porous body is effected in the same way as in the ordinary case of supporting catalyst ingredients. For example, the porous body for the impregnating operation is dipped in a solution of raw materials forming catalyst ingredients such as platinum nitrate, chloroplatinic acid, palladium nitrate or palladium chloride, dried, and then calcined. The total amount of the catalyst ingredients deposited on the porous body is preferably 0.1 g to 30 g per liter of the porous body. If the amount is less than 0.1 g/l, purifying activity of the catalyst is low, and if its amount is more than 30 g/l, no corresponding increase in activity can be observed.

In the present invention, the aforesaid porous body as a catalyst carrier is produced, for example, by molding a zirconia powder into the desired shape such as pellets, pillars and honeycombs, sintering the resulting shaped material by heating to form a porous sintered body of zirconia, and thereafter, incorporating at least one oxide of cerium oxide, manganese oxide and iron oxide into the porous sintered body. The incorporation of at least one oxide of cerium oxide, manganese oxide and iron oxide into the porous sintered body of zirconia is carried out, for example, as described in the Examples, by impregnating the porous sintered body of zirconia with an aqueous solution of cerium nitrate, manganese nitrate and iron nitrate, i.e., ferrous nitrate ($Fe(NO_3)_2$), ferric nitrate ($Fe(NO_3)_3$) and mixtures thereof, drying the impregnated porous sintered body, and heating it to convert the nitrate into the oxide.

Alternatively, the porous body as a catalyst carrier is produced by mixing a zirconia powder with at least one oxide powder of cerium oxide powder, manganese oxide powder and iron oxide powder, molding the mixed powder into the desired shape, and sintering the resulting shaped material by heating to form a porous sintered body of zirconia and at least one of the aforesaid oxides.

In sintering the mixed powder of zirconia and at least one oxide of cerium oxide, manganese oxide and iron oxide described above, it is preferable to mix about 1 to 5 percent by weight of alumina ($Al_2O_3$) as a binder for the porous sintered body together with the aforesaid powders.

In sintering the mixed powder, a small amount of an organic paste such as dextrin is admixed with the mixed powder. The mixture is molded into the desired size by a tablet-forming machine, etc., and sintered by heating in an electric furnace, etc.

Molding of the mixed powder is performed to produce any desired shape of a catalyst carrier such as pellets, pillars and honeycombs. To save the zirconia powder, it is possible to coat the aforesaid mixed powder of the present invention on a mother matrix such as a pellet and honeycomb structure of alumina, etc., produced separately from the present invention.

Having generally described this invention, a further understanding can be obtained by reference to certain specific examples which are provided herein for purposes of illustration only and are not intended to be limiting unless otherwise specified.

EXAMPLE 1

Cerium oxides were incorporated into porous sintered bodies of zirconia to form several different carriers. Furthermore, platinum (Pt), palladium (Pd) or both were supported on the above carriers to prepare the catalysts. Then, the purifying activities of these catalysts were evaluated. The aforesaid porous sintered bodies of zirconia were obtained by sintering the mixed powder of 98 percent by weight of a zirconia powder ($ZrO_2$) and two percent by weight of alumina powder to form pellets having a diameter of 3 mm, a pore volume of 0.15 cc/g, an apparent density of 1.84 g/cc. and a specific surface area of 50 mm$^2$/g.

The incorporation of cerium oxides ($CeO_2$) into the aforesaid porous sintered bodies of zirconia was carried out by impregnating the porous sintered bodies with an aqueous solution of cerium nitrates for an hour, drying the resulting porous sintered bodies at 110° C. for 8 hours, and heating them in the air for 3 hours to convert cerium nitrates into cerium oxides.

The carriers (carrier Nos. 1–7) having 26 g or 13 g of cerium oxide per liter of the porous sintered body were obtained by impregnating the aforesaid porous sintered bodies with the aqueous solution of cerium nitrate having the concentration of 50% or 20% by weight, respectively (Table 1).

Then, each of the resulting carriers was dipped in an aqueous solution of platinum nitrate or an aqueous solution of palladium nitrate, dried, and calcined in the air at 600° C. for 3 hours to prepare platinum (Pt) catalysts (Nos. $A_1$, $A_2$ and $A_5$) and palladium (Pd) catalysts (Nos. $A_3$, $A_4$ and $A_6$) shown in Table 2. Furthermore, platinum was deposited on the above carrier in the same way as above, and then palladium was again deposited to prepare a platinum-palladium (Pt-Pd) catalyst (No. $A_7$).

To evaluate the purifying activities of these catalysts, each of the catalysts was filled in a quartz tube and kept at 400° C. An exhaust gas from an internal combustion engine of an automobile was fed into the tube at a space velocity of 30,000/hour. The exhaust gas was obtained by operating the internal combustion engine such that the air-fuel ratio was changed periodically by 0.8 upward or downward of the theoretical air-fuel ratio (A/F=14.55) with a period of 2 seconds. The average concentrations of the noxious components in the exhaust gas in the above operation were approximately 0.1% for nitrogen oxides ($NO_x$), 0.62% for carbon monoxide (CO), 0.05% for hydrocarbons (HC), 12% for carbon dioxide ($CO_2$), 0.2% for hydrogen ($H_2$), 0.54% for oxygen ($O_2$), 13% for water ($H_2O$), and the remainder being nitrogen ($N_2$), all by volume.

The purifying activities were rated by the percent reduction of nitrogen oxides ($NO_x$), carbon monoxide (CO) and hydrocarbons (HC) of the above noxious components.

The results are shown in Table 2.

For comparison, a platinum catalyst (No. S1) and a palladium catalyst (No. S2) were prepared in the same way as above except that the porous sintered bodies of only zirconia (carrier Nos. C1 and C2) were used as the catalyst carriers.

These catalysts were evaluated in the same manner as above. The data for these comparative catalysts are also shown in Table 2.

The amount of catalyst ingredients deposited were indicated by weight per liter (g/l) of a catalyst carrier.

TABLE 1

| Carrier No. | | $CeO_2$ (g/l$^2$) |
|---|---|---|
| 1 | | 26 |
| 2 | | 26 |
| 3 | | 26 |
| 4 | | 26 |
| 5 | Porous Sintered Bodies | 13 |
| 6 | of Zirconia | 13 |
| 7 | | 13 |
| C1 | | — |
| C2 | | — |

TABLE 2

| Catalyst Number | Carrier Number | Catalyst Ingred. (g/l) | | % Reduction(%) | | | |
|---|---|---|---|---|---|---|---|
| | | Pt | Pd | CO | $NO_x$ | HC | |
| A1 | 1 | 3 | — | 100 | 100 | 99 | |
| A2 | 2 | 1.1 | — | 100 | 99 | 99 | Present |
| A3 | 3 | — | 3.5 | 100 | 99 | 98 | Invention |
| A4 | 4 | — | 1.5 | 100 | 96 | 97 | |
| A5 | 5 | 1.1 | — | 99 | 98 | 98 | |
| A6 | 6 | — | 1.5 | 100 | 99 | 98 | |
| A7 | 7 | 0.6 | 1.1 | 100 | 98 | 98 | |
| S1 | C1 | 1.1 | — | 85 | 76 | 70 | Compari- |
| S2 | C2 | — | 1.5 | 87 | 72 | 64 | son |

It is evident from the above table that the catalysts in accordance with this invention have a much higher purifying activity than the comparative catalysts (Nos. S1 and S2) on any of the noxious components tested.

EXAMPLE 2

Carriers were formed by incorporating at least one oxide of cerium oxide ($CeO_2$), manganese oxide ($MnO_2$) and iron oxide (FeO, $Fe_2O_3$ and the mixtures thereof) into the same porous sintered bodies of zirconia as in Example 1. Then, the catalysts were prepared by using these carriers in the same way as described in Example 1. The purifying activities of the catalysts were evaluated.

In the incorporation of at least one oxide of cerium oxide, manganese oxide and iron oxide into the porous sintered bodies of zirconia, each aqueous solution of cerium nitrate, manganese nitrate and iron nitrate was used.

In the case of incorporating more than two oxides of cerium oxide, manganese oxide and iron oxide, one oxide after another was incorporated into the porous sintered body of zirconia. When cerium oxide and manganese oxide are, for example, incorporated into the porous sintered body of zirconia, the porous sintered body was firstly impregnated with cerium nitrate in the same way as shown in Example 1, dried and heated so as to convert cerium nitrate into cerium oxide.

Thereafter, the resulting porous sintered body was impregnated with manganese nitrate, dried and heated so as to convert manganese nitrate into manganese oxide.

The compositions of the carriers (carrier Nos. 8–14) obtained by the aforesaid method are shown in Table 3.

Each catalyst (catalyst Nos. A8 to A14) and the purifying activities thereof are shown in Table 4.

TABLE 3

| Carrier No. | | $CeO_2$(g/l) | $MnO_2$(g/l) | $Fe_2O_3$(g/l) |
|---|---|---|---|---|
| 8 | | — | 21 | — |
| 9 | Porous Sin- | — | — | 24 |
| 10 | tered Bodies | — | 21 | — |
| 11 | of Zirconia | — | — | 24 |
| 12 | | 12 | 13 | — |
| 13 | | 12 | — | 15 |
| 14 | | 7 | 6 | 8 |

TABLE 4

| Catalyst Number | Carrier Number | Catalyst Ingred. (g/l) | | Percent Reduction (%) | | |
|---|---|---|---|---|---|---|
| | | Pt | Pd | CO | $NO_x$ | HC |
| A8 | 8 | — | 1.6 | 100 | 95 | 88 |
| A9 | 9 | — | 1.6 | 99 | 91 | 84 |
| A10 | 10 | 1.1 | — | 100 | 95 | 90 |
| A11 | 11 | 1.1 | — | 98 | 97 | 93 |
| A12 | 12 | — | 1.6 | 100 | 99 | 99 |
| A13 | 13 | — | 1.6 | 100 | 99 | 98 |
| A14 | 14 | — | 1.6 | 98 | 96 | 95 |

It is evident from Table 4 that each catalyst exhibits a much higher purifying activity than the comparative catalysts (Nos. S1 and S2 in Table 2).

Having now fully described this invention, it will be apparent to one of ordinary skill in the art that many changes and modifications can be made thereto without departing from the spirit or scope of the invention set forth herein.

What is claimed as new and intended to be covered by Letters Patent is:

1. A catalyst for reducing nitrogen oxides, carbon monoxide and hydrocarbons, the noxious components in exhaust gases comprising:
    a porous carrier consisting essentially of zirconia and at least one oxide selected from the group consisting of cerium oxide, manganese oxide and iron oxide; and
    a metal as a catalyst ingredient supported thereon selected from the group consisting of platinum, palladium and mixtures thereof.

2. The catalyst according to claim 1, wherein the porous carrier contains from 1 g to 80 g of at least one oxide selected from the group consisting of cerium oxide, manganese oxide and iron oxide per liter thereof.

3. The catalyst according to claim 1, wherein said porous carrier is prepared by impregnating a porous sintered body of zirconia with an aqueous solution of at least one salt of iron, manganese and/or cerium; drying the resulting impregnated oxide; and heating the oxide to convert the metal salt(s) into the oxide(s).

4. The catalyst according to claim 1, wherein said porous carrier is prepared by mixing zirconia powder with at least one powdered metal oxide selected from the group consisting of cerium oxide, manganese oxide and iron oxide; molding the resulting metal oxide mixture and sintering the molded oxide object.

5. The catalyst according to claim 1, wherein the porous carrier contains 1 to 5 percent by weight of alumina as a binder for a porous sintered body.

6. The catalyst according to claim 1, wherein the content of the metal as a catalyst ingredient is from 0.1 g to 30 g per liter of the porous carrier.

7. The catalyst according to claim 1, wherein the shape of the catalyst is one selected from the group consisting of pellets, pillars and honeycombs.

8. A method for producing the catalyst according to claim 1, which comprises:
    molding a zirconia powder into the desired shape;
    sintering the resulting shaped material by heating to form a porous sintered body of zirconia; and thereafter incorporating
    at least one oxide selected from the group consisting of cerium oxide, manganese oxide and iron oxide into said porous sintered body of zirconia to form a catalyst carrier; and
    supporting the metal as a catalyst ingredient selected from the group consisting of platinum, palladium and mixtures thereof on said porous sintered body.

9. The method according to claim 8, wherein the step of incorporating said at least one oxide into the porous sintered body of zirconia comprises: impregnating said porous sintered body with an aqueous solution of nitrate selected from the group consisting of cerium nitrate manganese nitrate and iron nitrate, drying the impregnated porous sintered body and heating it so as to convert said nitrate into said oxide.

10. The method according to claim 8, wherein the step of supporting said metal on the porous sintered body comprises impregnating said porous sintered body with a solution of a material selected from the group consisting of platinum nitrate, chloroplatinic acid, palladium nitrate and palladium chloride, drying the resulting porous sintered body and calcining it.

11. The method according to claim 8, wherein said zirconia powder is molded into the shape selected from the group consisting of pellets, pillars and honeycombs.

12. The method for producing the catalyst according to claim 1, which comprises:
    mixing zirconia powder with at least one metal oxide powder selected from the group consisting of cerium oxide, manganese oxide and iron oxide; molding the mixed powder into the desired shape; sintering the resulting shaped material by heating the shaped material, thereby forming the catalyst carrier; and
    supporting the metal as a catalyst ingredient selected from the group consisting of platinum, palladium and mixtures thereof on said porous sintered body.

13. The method according to claim 12, wherein the step of supporting said metal on the porous sintered body comprises impregnating said porous sintered body with a solution of a material selected from the group consisting of platinum nitrate, chloroplatinic acid, palladium nitrate and palladium chloride, drying the resulting porous sintered body and calcining it.

* * * * *